Patented June 14, 1938

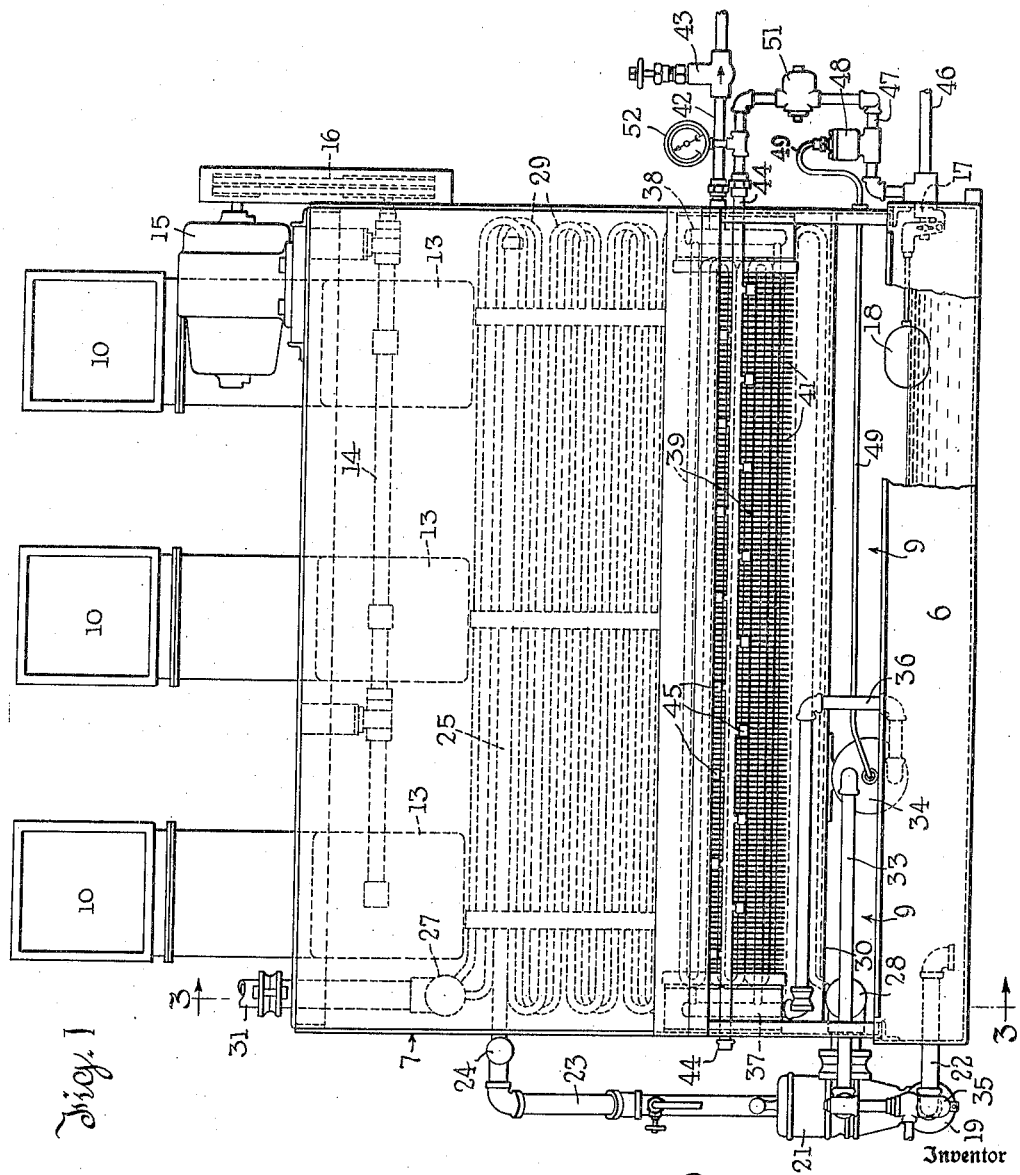

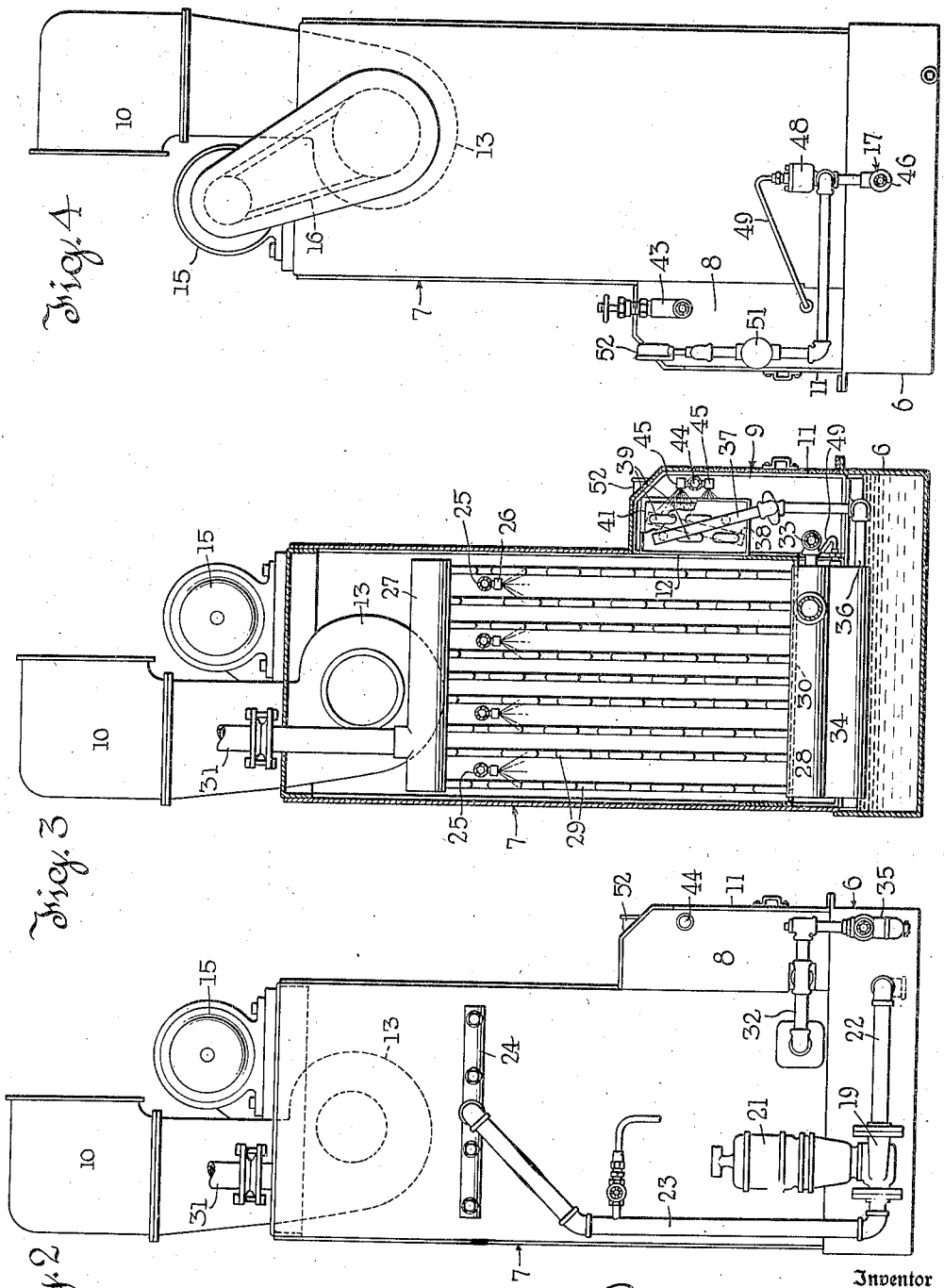

2,120,767

UNITED STATES PATENT OFFICE 2,120,767

REFRIGERATION APPARATUS

Francis M. Raver, York, Pa., assignor to York Ice Machinery Corporation, York, Pa., a corporation of Delaware Application May 1, 1937, Serial No. 140,251

6 Claims. (Cl. 257—32)

This invention relates to condensers and particularly to condenser cooling towers used chiefly for liquefying refrigerants, in mechanical refrigerating systems.

The invention, though applicable to any condenser using a cooling tower, will be described as embodied in a condenser cooling tower; i. e., a device in which the heat transfer surface of the condenser is in the tower and thus directly affected by the air current and the water sprays in the tower.

In any cooling tower part of the sprayed water is evaporated, and the latent heat of vaporization of the evaporated water accounts for a large proportion of the heat rejected. Theoretically, the temperature at which condensation occurs approaches the wet bulb temperature of the circulated air, but actually it is substantially higher than this unless much power be consumed in atomized spraying.

Conventional condenser cooling towers have cooling coils for the condensed liquid located below the condensing coils and in the path of water leaving such coils. In such devices the final temperature of the condensed liquid is not lower than the temperature of water leaving the condensing coils.

Substantial economies can be effected by reducing the temperature of the liquid refrigerant. For example, with a refrigerant of low latent heat such as Freon-12 (trade-name), the increase in compressor capacity is approximately ½ of 1% for each Fahrenheit degree reduction of liquid temperature, because flash gas is reduced and the effective capacity of the compressor is correspondingly enhanced.

The present invention provides method and means for reducing the temperature of the liquid substantially to the wet bulb temperature of the cooling tower air, without requiring complicated additional apparatus and without material increase in power consumption for air circulation or spraying.

The invention is based on the facts that make-up water is required by any cooling tower, and that city water temperatures, under normal conditions, approximate the wet bulb air temperature. In carrying out the invention, city water is used for make-up, and the make-up water, or a substantial part thereof, is finely atomized in the air entering the cooling tower for the purpose of cooling the water and air to the wet bulb temperature of the air before they encounter the cooling coil. The water and air at the wet bulb temperature of the air cool the condensed liquid. In this way the lowest temperature attainable by air circulation, combined with water spray, is secured in a simple and commercially practicable manner.

Obviously, the presence of a cooling tower using make-up water, is the controlling factor. The specific form of the condenser is secondary. As stated above, the invention is capable of convenient use with a condenser cooling tower.

Such an installation will now be described as the preferred embodiment, but is intended as exemplary and not limiting.

In the drawings,—

Fig. 1 is a front elevation of a condenser cooling tower and liquid sub-cooler, embodying the invention. The screen at the air entrance is omitted. Certain internal parts are indicated in dotted lines, and others are rendered visible by breaking away parts of the casing.

Fig. 2 is an elevation of the left end of the device shown in Fig. 1.

Fig. 3 is a section on the line 3—3 of Fig. 1.

Fig. 4 is an elevation of the right end of the device shown in Fig. 1.

The base of the device comprises a water pan or sump 6, in which rests a rectangular housing 7 enclosing the condenser cooling tower components. Housing 7 has a forward extension 8 which houses the sub-cooler for condensed liquid.

Air enters at 9 through a port in the front of extension 8, the opening being protected by a removable screen 11 (see Figs. 2-4, the screen being omitted from Fig. 1). From the interior of extension 8 the air passes to the interior of main housing 7 via opening 12 (see Fig. 3) and flows thence upward to a series of centrifugal fans 13 (three being shown) which discharge through hoods 10 intended to be connected by ducts (not shown) to any suitable point of air discharge. The openings 9 and 12 extend the entire length of the front of the respective housings, so that the air stream is coextensive with the entire length of both housings.

The runners of the fans 13 are mounted on a common shaft 14, which extends beyond the end of housing 7, and is driven by motor 15 through a multiple V-belt drive indicated at 16. The fans are driven continuously when the condenser is in operation.

The pan 6 contains water to a level maintained substantially constant by valve 17 actuated by float 18. A rotary pump 19 driven by motor 21 draws water from sump 6 through a pipe 22 and delivers it through pipe 23 to manifold 24, to which are connected parallel shower pipes 25 extending horizontally substantially the entire length of housing 7. The shower pipes have each a series of spaced, downwardly directed spray heads 26, as indicated. Pump 19 runs continuously when the condenser is in operation.

The condenser comprises an upper (gas) header 27, and a lower (liquid) header 28 connected by a plurality of sinuous tubes 29, nine being indicated, the tubes 29 being spaced across the air path and having a plurality of horizontal passes arranged to be wetted by spray from heads 26. The high pressure gas line from the compressor (not shown) is indicated at 31 and leads to the gas header 27. The liquid header 28 is connected by pipes 32, 33, with the receiver 34, which is below tubes 29, and below a coil support 30 which supports the condenser coil 29. A pressure relief valve is indicated at 35.

From the lower portion of receiver 34 a pipe 36 leads to entrance header 37 of the liquid cooler. Between this and an exit header 38 are a plurality of sinuous tubes 39 (two being shown). Each tube makes several horizontal passes, and a series of closely-spaced plate fins 41 are mounted on the tubes 39 to increase the heat transfer surface. The liquid cooler, comprising the headers, tubes and fins, overlies and is coextensive with the opening 12, the fins being parallel with and the tubes transverse to the path of air flow across extension 8 from entrance 9 to port 12.

From exit header 38 the liquid line 42 leads to expansion valve 43. Valve 43 typifies means for feeding liquid refrigerant to an evaporator (not shown) which, as usual, is connected to the suction of the compressor (not shown) or its equivalent.

It is important to observe that, as above stated, the pipe 36 leads from the lower portion of the receiver 34 so that the receiver, because it is partially filled with liquid refrigerant, serves as an isolating trap between the condenser proper and the sub-cooler. In order that the sub-cooler may perform its intended function, entrance of uncondensed vapor from the condenser proper into the sub-cooler must be prevented. Otherwise the sub-cooler would become merely an extension of the condenser and would operate to condense and not to sub-cool.

Arranged in front of tubes 39 is a spray pipe 44 with atomizing nozzles 45 arranged to spray finely atomized water into the air entering at 9 against the tubes 39 and fins 41. Part of this water is evaporated and the remainder falls to sump 6 and serves as a part of the make-up for water evaporated as an incident to condensing the refrigerant in tubes 29.

The water supplied to pipe 44 is city water under service pressure arriving via pipe 46. The pipe 46 also supplies valve 17, which under control of float 18, maintains the water level in pan 6 substantially constant. From pipe 46 a branch 47 leads to the regulating valve 48. This is a pressure actuated stop valve subject to receiver pressure transmitted through tube 49. Valve 48 is arranged to open the water passage in response to normal receiver pressure, and close it when the receiver pressure falls below normal, as it does when the compressor is shut down. From valve 48 the water passes through pressure reducing valve 51 to spray pipe 44. A gage 52 indicates the pressure in the spray pipe.

The arrangement is such that at the maximum rate of supply through spray pipe 44, there will not be more than enough water for make-up purposes. The float valve supplies any deficiency.

The pressure reducing valve keeps the spray heads under proper spraying pressure. The regulating valve 48 shuts down the sprays when the compressor stops and turns them on when the compressor starts.

It should be observed that the liquid cooling coil is coextensive with the opening 12, but that the air entrance opening through the screen 11 is of considerably greater extent and that a part of the entering air flows above the water in the pan 6 and thence upwards over the coils 29, while another portion of the air flows through the liquid cooler to the opening 12 and thence upwards over the coils 29. The resistances to flow in the two paths are so chosen that an adequate flow of air over the liquid cooling coils is had. It is not necessary to pass all the air used in the condenser over the liquid cooling coils, and it will be observed further that not all the water sprayed by the nozzles 45 is evaporated.

The principle of operation will be readily understood. The condensed liquid is cooled by the coldest available air and water after they have been cooled by evaporation of the water, to a temperature which is substantially the wet bulb temperature of the air. This water not only acts directly on the cooling surface but supplies part of the make-up.

Thus there is no appreciable increase in water consumption, and no power is used in spraying the liquid cooling water, since city supply pressure is used for this purpose.

As already suggested, the invention is applicable to various types of condensers including cooling towers and the specific embodiment above described is intended to be illustrative and not limiting.

What is claimed is:

1. The combination of a surface condenser; a cooling tower including means for circulating air through the tower, means for bringing water contained in the tower into intimate contact with said circulated air to cool a part of the water by evaporation of another part, and means for progressively supplying makeup water to replace the part evaporated; means for causing said cooled part of the water to cool the condenser; a surface cooler connected to receive liquid condensate from the condenser, the connection being such as to inhibit the entrance of uncondensed vapor into the surface cooler; and means for causing at least a part of the circulated air and makeup water as they approach said tower conjointly to cool said surface cooler.

2. The combination of a cooling tower and associated condenser, the condenser being cooled at least in part by water which is cooled in the cooling tower by evaporation of a part thereof in an air stream circulated through the tower; a surface cooler connected to receive and cool liquid condensed in said condenser, the connection being such as to inhibit the entrance of uncondensed vapor into the surface cooler, and said surface cooler being in the path of the air stream entering the cooling tower; and means for spraying makeup water into heat exchanging relation with said surface cooler and for causing unevaporated portions thereof to enter said cooling tower.

3. The combination of a cooling tower and associated condenser, the condenser being cooled at least in part by water which is cooled in the cooling tower by evaporation of a part thereof in an air stream circulated through the tower; a surface cooler connected to receive and cool liquid condensed in said condenser, the connection being such as to inhibit the entrance of uncondensed vapor into the surface cooler, and said surface cooler being in the path of the air stream entering the cooling tower; and means for supplying makeup water to said cooling tower, at least a portion of said makeup water being sprayed into said entering air stream to cool the same in advance of its contact with said surface cooler.

4. The combination of a casing including a water collecting sump; a surface condenser in said casing; means for passing air through said casing in contact with said condenser; means for spraying water from said sump into contact with said air and condenser and for returning unevaporated spray water to said sump; a surface cooler in the path of air entering said casing and connected to receive and cool liquid condensed in said condenser the connection being such as to inhibit the entrance of uncondensed vapor into the surface cooler; and means for supplying makeup water to said sump, said means being arranged to spray at least a portion of the makeup water into heat exchanging relation with the entering air and said surface cooler.

5. A vapor condensing and liquid cooling device comprising two surface coolers connected in series, the connection being such as to inhibit the passage of uncondensed vapor from the first to the second cooler the first cooler serving to condense and the second serving to sub-cool a volatile medium passed therethrough in the order stated; means for passing a stream of air first into heat exchanging contact with the second cooler and then into heat exchanging contact with the first cooler; a water collecting sump; means for spraying water from said sump into contact with the first cooler and for causing return of unevaporated portions thereof to said sump; and means for supplying cold makeup water to said sump, said means including means for spraying at least a portion of said makeup water into heat exchanging relation with said second cooler, prior to delivery to said sump.

6. The combination of a surface condenser; a liquid cooler of the surface type to which the condenser delivers; means for maintaining a liquid seal between said condenser and cooler whereby the entrance of uncondensed vapor from the condenser to the cooler is prevented; means for circulating air in a stream in heat exchanging relation with the cooler and then with at least a substantial portion of the condenser; means for supplying cooling water and for spraying it into the air as the latter exchanges heat with the cooler; and means for spraying the unevaporated remainder of said water into the portion of the air stream which exchanges heat with the condenser.

FRANCIS M. RAVER.

DISCLAIMER 2,120,767.—*Francis M. Raver*, York, Pa. REFRIGERATION APPARATUS. Patent dated June 14, 1938. Disclaimer filed June 29, 1939, by the assignee, *York Ice Machinery Corporation*.

Hereby enters this disclaimer to claim 2 in said specification.

[*Official Gazette July 25, 1939.*]